(12) United States Patent
Tanaka

(10) Patent No.: US 7,075,514 B2
(45) Date of Patent: Jul. 11, 2006

(54) COORDINATE INPUT APPARATUS, CONTROL METHOD THEREFOR, AND COMPUTER-READABLE MEMORY

(75) Inventor: Atsushi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/066,620

(22) Filed: Feb. 6, 2002

(65) Prior Publication Data

US 2002/0140673 A1 Oct. 3, 2002

(30) Foreign Application Priority Data

Feb. 8, 2001 (JP) ............................. 2001-032289

(51) Int. Cl.
*G09G 5/08* (2006.01)
*G08C 21/00* (2006.01)
(52) U.S. Cl. ............... 345/157; 345/156; 345/179; 178/19.01; 178/19.02; 178/19.03
(58) Field of Classification Search ........ 345/156–168, 345/173–179; 178/18.01–18.07, 19.01–19.06
See application file for complete search history.

(56) References Cited

U.S. PATENT DOCUMENTS

| | | | |
|---|---|---|---|
| 4,613,964 A | 9/1986 | Ichikawa et al. ............ 369/45 |
| 4,886,943 A | 12/1989 | Suzuki et al. .................. 178/18 |
| 4,887,245 A | 12/1989 | Mori et al. .................. 367/129 |
| 4,897,510 A | 1/1990 | Tanaka et al. ................. 178/18 |
| 4,910,363 A | 3/1990 | Kobayashi et al. ........... 178/18 |
| 4,931,965 A | 6/1990 | Kaneko et al. ............. 364/560 |
| 4,980,518 A | 12/1990 | Kobayashi et al. ............ 178/18 |
| 5,017,913 A | 5/1991 | Kaneko et al. ............. 340/712 |
| 5,070,325 A | 12/1991 | Tanaka et al. ............... 340/706 |
| 5,097,102 A | 3/1992 | Yoshimura et al. ........... 178/18 |
| 5,142,106 A | 8/1992 | Yoshimura et al. ........... 178/18 |
| 5,210,785 A | 5/1993 | Sato et al. ..................... 379/58 |
| 5,231,394 A | 7/1993 | Sato ............................ 341/50 |
| 5,239,138 A | 8/1993 | Kobayashi et al. ........... 178/18 |
| 5,500,492 A | 3/1996 | Kobayashi et al. ........... 178/18 |
| 5,517,553 A | 5/1996 | Sato ............................ 379/59 |
| 5,539,678 A | 7/1996 | Tanaka et al. .............. 364/561 |
| 5,565,893 A | 10/1996 | Sato et al. .................. 345/177 |
| 5,587,558 A | 12/1996 | Matsushima ................ 178/18 |
| 5,615,318 A * | 3/1997 | Matsuura .................... 345/420 |
| 5,621,300 A | 4/1997 | Sato et al. ..................... 320/5 |
| 5,714,698 A | 2/1998 | Tokioka et al. ............ 73/865.4 |
| 5,736,979 A | 4/1998 | Kobayashi et al. ......... 345/177 |
| 5,751,133 A | 5/1998 | Sato et al. ..................... 320/13 |
| 5,805,147 A | 9/1998 | Tokioka et al. ............. 345/173 |
| 5,818,429 A | 10/1998 | Tanaka et al. ............. 345/173 |
| 5,831,603 A | 11/1998 | Yoshimura et al. ......... 345/177 |
| 5,933,149 A | 8/1999 | Mori et al. ................. 345/442 |
| 5,936,207 A | 8/1999 | Kobayashi et al. ...... 178/18.01 |
| 6,359,616 B1 * | 3/2002 | Ogura et al. ................ 345/173 |

* cited by examiner

*Primary Examiner*—Vijay Shankar
(74) *Attorney, Agent, or Firm*—Fitzpatrick, Cella, Harper & Scinto

(57) ABSTRACT

An arithmetic control circuit stores a set of coordinate values of a plurality of points for defining a coordinate input area in an arbitrary space in advance, and determines whether a three-dimensional coordinate value as the position coordinates of the indicating tool belongs to the coordinate input area defined by the stored set of coordinate values. The three-dimensional coordinates of the indicating tool are then converted into a two-dimensional coordinate value corresponding to a display window on the basis of the determination result obtained by a determination unit.

11 Claims, 13 Drawing Sheets

FIG. 13

| AREA | PEN TIP SWITCH 41 | PEN SIDE SWITCH 42_a | PEN SIDE SWITCH 42_b | PEN DOWN SIGNAL |
|---|---|---|---|---|
| AREA A | LEFT | LEFT | RIGHT | PEN TIP SW |
| AREA B | DOUBLE CLICK | RIGHT | LEFT | SIDE SW1 |
| AREA C | LEFT | LEFT | RIGHT | DOWN |

COORDINATE INPUT APPARATUS, CONTROL METHOD THEREFOR, AND COMPUTER-READABLE MEMORY

FIELD OF THE INVENTION

The present invention relates to a coordinate input apparatus for detecting the three-dimensional position coordinates of an indicating tool used in combination with a display for displaying a window based on two-dimensional coordinates, a control method for the apparatus, and a computer-readable memory.

BACKGROUND OF THE INVENTION

Conventionally, an apparatus is known, which overlays a coordinate input apparatus capable of inputting coordinates on the display window of a display such as a CRT display, liquid crystal display (LC), or projector, and displays a handwriting based on pointing or writing performed by an operator on the display, thereby realizing a relationship like the one between paper and pencil.

Examples of a coordinate input apparatus are a resistive film input apparatus, an electrostatic input apparatus, an apparatus having a transparent input panel such as an ultrasonic panel for propagating ultrasonic waves on a coordinate input surface made of glass or the like, an optical input apparatus, an apparatus for detecting a position by emitting sound waves into the air, and an apparatus based on an electromagnetic induction (electromagnetic exchange) scheme, which has a coordinate calculating mechanism and transparent protective plate placed on the rear side and front surface of a display, respectively, to form an integral input/output information apparatus.

Such information apparatuses that have recently developed include a pen input computer with a relatively large size or the like along a trend toward larger displays as well as a portable compact electronic notebook. Such information apparatuses are being used for presentation apparatuses, videoconference systems, and the like in combination with large displays such as front projectors, rear projectors, and PDPs. Displays such as large liquid crystal displays and PDP displays have currently been improved in image quality and reduced in cost. In addition, in parallel with digitization of satellite broadcasts and the like, TV specifications/forms have begun to enter an age of transition.

These large displays have replaced, for example, whiteboards or electronic blackboards used in offices and have begun to be used for conferences or meetings in which data prepared in personal computers are displayed on the large displays. In such a case, for example, the contents of information displayed on the display window of a large display can be switched, like those on a whiteboard, by an operator or participant when he/she directly touches the window to control the personal computer so as to update the display information.

Consider a large integral input/output system of this type. In consideration of a meeting with a large number of participants, the system is preferably designed to allow an inquirer to operate a window in an arbitrary place by remote control or acquire information from a network, as needed, as well as making an operator go to a display window and control a personal computer by directly touching the window.

SUMMARY OF THE INVENTION

The present invention has been made to solve the above problem, and has as its object to provide a coordinate input apparatus which can realize coordinate input operation with high precision from an arbitrary place, a control method for the apparatus, and a computer-readable memory.

According to the present invention, the foregoing object is attained by providing a coordinate input apparatus which detects three-dimensional position coordinates of an indicating tool used in combination with a display for displaying a window based on two-dimensional coordinates, comprising: storage means for storing a set of coordinate values of a plurality of points for defining a coordinate input area in an arbitrary space; determination means for determining whether a three-dimensional coordinate value as position coordinates of the indicating tool belongs to the coordinate input area defined by the set of coordinate values stored in the storage means; and conversion means for converting the three-dimensional coordinates of the indicating tool into a two-dimensional coordinate value corresponding to the display window on the basis of the determination result obtained by the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a view showing a definition table according to the present invention.

DETAILED DESCRIPTION OF THE PREFERRED EMBODIMENTS

The preferred embodiments of the present invention will be described in detail below with reference to the accompanying drawings.

A coordinate input apparatus using ultrasonic vibrations will be described first as an apparatus capable of three-dimensional coordinate detection.

Figure 1:
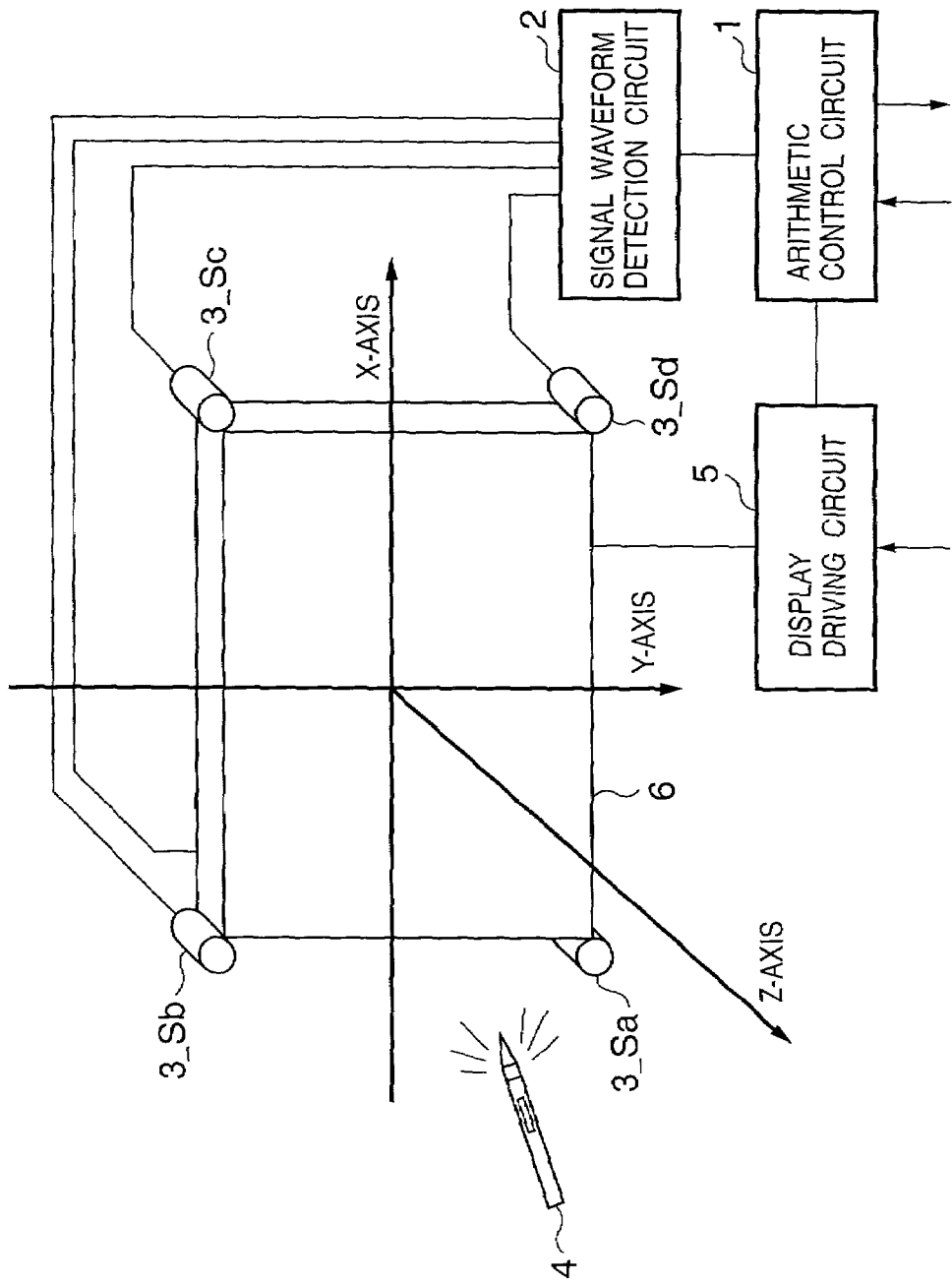
FIG. 1 is a view showing the schematic arrangement of a coordinate input apparatus capable of measuring three-dimensional (space) coordinates according to the present invention.

FIG. 1 is a view showing the schematic arrangement of a coordinate input apparatus capable of three-dimensional (space) coordinate measurement.

Referring to FIG. 1, reference numeral 4 denotes a coordinate input pen 4 serving as a writing tool designed to generate a sound wave into the air in accordance with the coordinate input operation performed by an operator. The generated sound wave is detected by a plurality of sensors 3 (four sensors 3_Sa to 3_Sd in this embodiment). The resultant information is processed by a signal waveform detection circuit 2 using a method to be described later, thereby calculating a sound wave source position (X, Y, Z) of the coordinate input pen 4. The arithmetic control circuit 1 controls the overall apparatus and is designed to move the cursor displayed on a display 6 or display and additionally write handwriting information such as writing through a display driving circuit 5 on the basis of obtained coordinate data.

Figure 2:
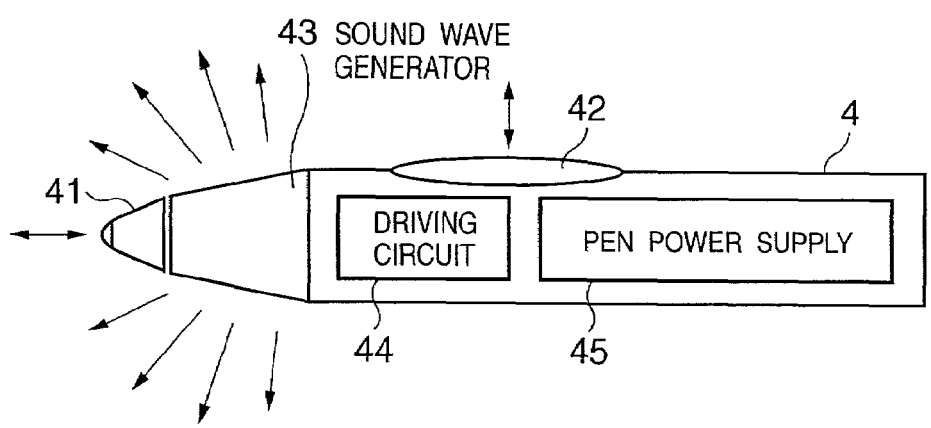
FIG. 2 is a view showing the arrangement of a coordinate input pen according to the present invention.

The arrangement of the coordinate input pen 4 will be described next with reference to FIG. 2.

A sound wave generator 43 incorporated in the coordinate input pen 4 is driven by a pen power supply 45 and a driving circuit 44 constituted by a timer, an oscillation circuit, a control circuit for performing control upon detecting information from a plurality of switches mounted in the coordinate input pen 4, and the like. A driving signal for the sound wave generator 43 is a pulse signal which is generated by the timer and repeats at a predetermined period. This signal is amplified with a predetermined gain by the oscillation circuit and applied to the sound wave generator 43. This electrical driving signal is converted into mechanical vibrations by the sound wave generator 43. As a consequence, the energy of the vibrations is emitted into the air.

Note that the coordinate input pen 4 includes a pen tip switch (SW) 41 which operates when the pen tip is pressed, and a plurality of pen side switches (SW) 42 mounted in the housing of the coordinate input pen 4.

The driving circuit 44 outputs a signal for driving the sound wave generator 43 in the coordinate input pen 4 at a predetermined period (e.g., every 10 msec; in this case, since a sound wave is emitted 100 times per sec, the coordinate output sampling rate in this coordinate input apparatus is 100/sec). This sound wave arrives at the respective sensors 3_Sa to 3_Sd to be detected with delays corresponding to the distances from the sound wave generator 43 to the sensors 3_Sa to 3_Sd. This type of coordinate input apparatus is a system basically designed to calculate the distances between the sound wave generator 43 and sensors 3_Sa to 3_Sd from the products of the known sound velocity of a sound wave and the respective arrival times and geometrically obtain the position information of the sound wave generator 43 by using the position information from each of the sensors 3_Sa to 3_Sd. A method of detecting the arrival times of this sound wave will be described with reference to FIGS. 3 and 4.

Figure 3:
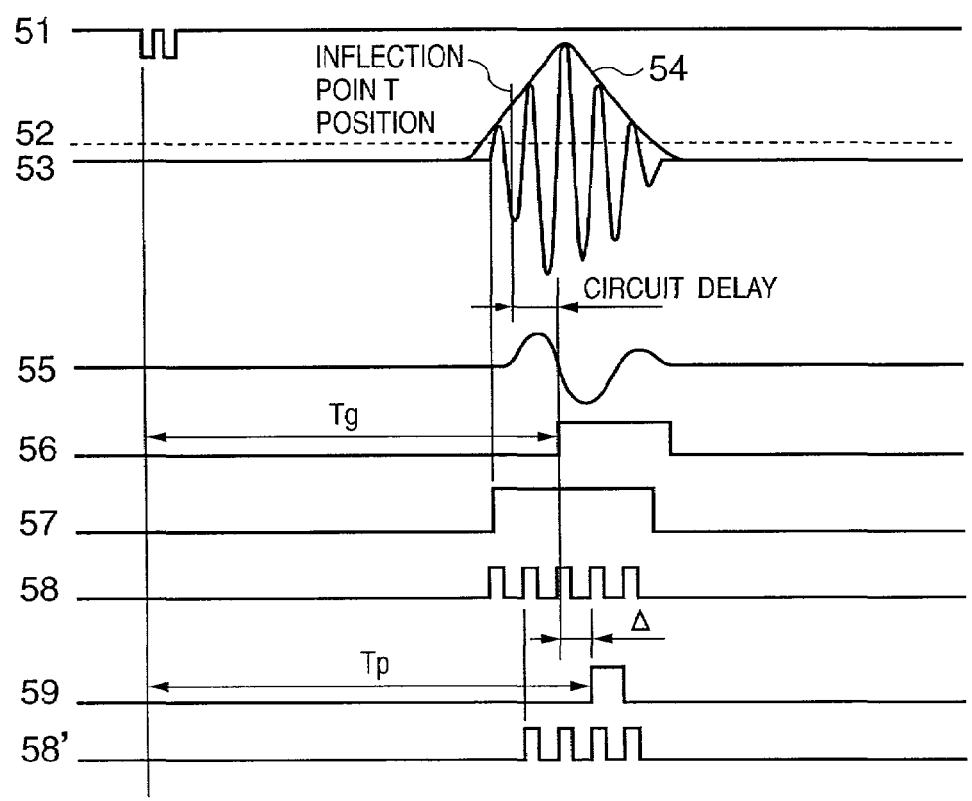
FIG. 3 is a timing chart for explaining a method of detecting the arrival time of a sound wave according to the present invention.
Figure 4:
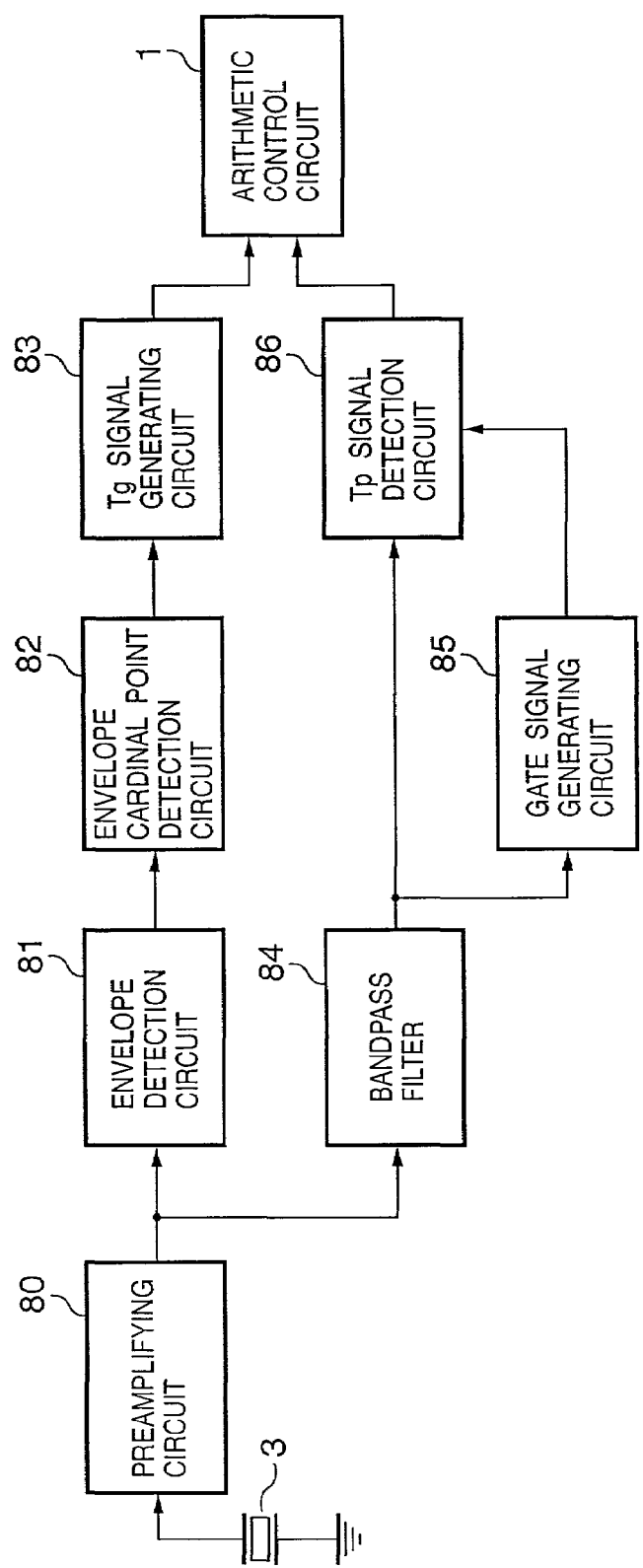
FIG. 4 is a block diagram of a circuit for realizing sound wave arrival time detection according to the present invention.

FIG. 3 is a timing chart for explaining a method of detecting the arrival times of a sound wave according to the present invention. FIG. 4 is a block diagram of a circuit which implements detection of the arrival times of a sound wave according to the present invention.

Reference numeral 51 denotes a driving signal generated by the driving circuit 44. Upon generation of the driving signal 51, a start signal is generated. This start signal is sent to the arithmetic control circuit 1 through, for example, an infrared LED or the like (not shown) incorporated in the coordinate input pen 4 to start a timer 12 (see FIG. 5) in the arithmetic control circuit 1.

The sound wave emitted into the air is detected by the sensors 3_Sa to 3_Sd with delays corresponding to the distances between the sound wave generator 43 and the sensors 3_Sa to 3_Sd. Reference numeral 53 denotes a detection signal detected by the sensors 3_Sa to 3_Sd and amplified to a predetermined level by a preamplifying circuit 80. This detection signal 53 is processed by an envelope detection circuit 81 constituted by an absolute value circuit, a low-pass filter, and the like to extract only an envelope 54 from the detection signal.

Consider this envelope 54. The sound velocity at which the waveform of the envelope 54 propagates is a group velocity Vg. If a cardinal point of the envelope 54, e.g., a peak or inflection point of the envelope 54, is detected, a delay time tg associated with the group velocity Vg is obtained. An envelope cardinal point detection circuit 82 for detecting a peak or inflection point of the envelope 54 can easily detect such a point by using a differentiating circuit and zero-crossing comparator. In the first embodiment, second-order differentiation is performed to form a signal 55, and an inflection point of the envelope 54 is detected (signal 56) by referring to a gate signal compared with the threshold level 52 and signal 53. When the timer 12 which is operated by the above start signal is stopped by using this signal 56, a group delay time Tg associated with the group velocity Vg can be detected.

Strictly speaking, this group delay time Tg includes a delay in the circuit associated with waveform processing. However, by a method to be described later, the influence of such a delay is completely eliminated. For the sake of simple explanation, therefore, it is assumed that there is no circuit delay time.

According to the above description, the distance L between the sound wave generator 43 and each of the sensors 3_Sa to 3_Sd can be obtained by the following equation:

$$L = Vg \times Tg \qquad (1)$$

The schematic arrangement of the arithmetic control circuit 1 according to the present invention will be described next with reference to FIG. 5.

Figure 5:
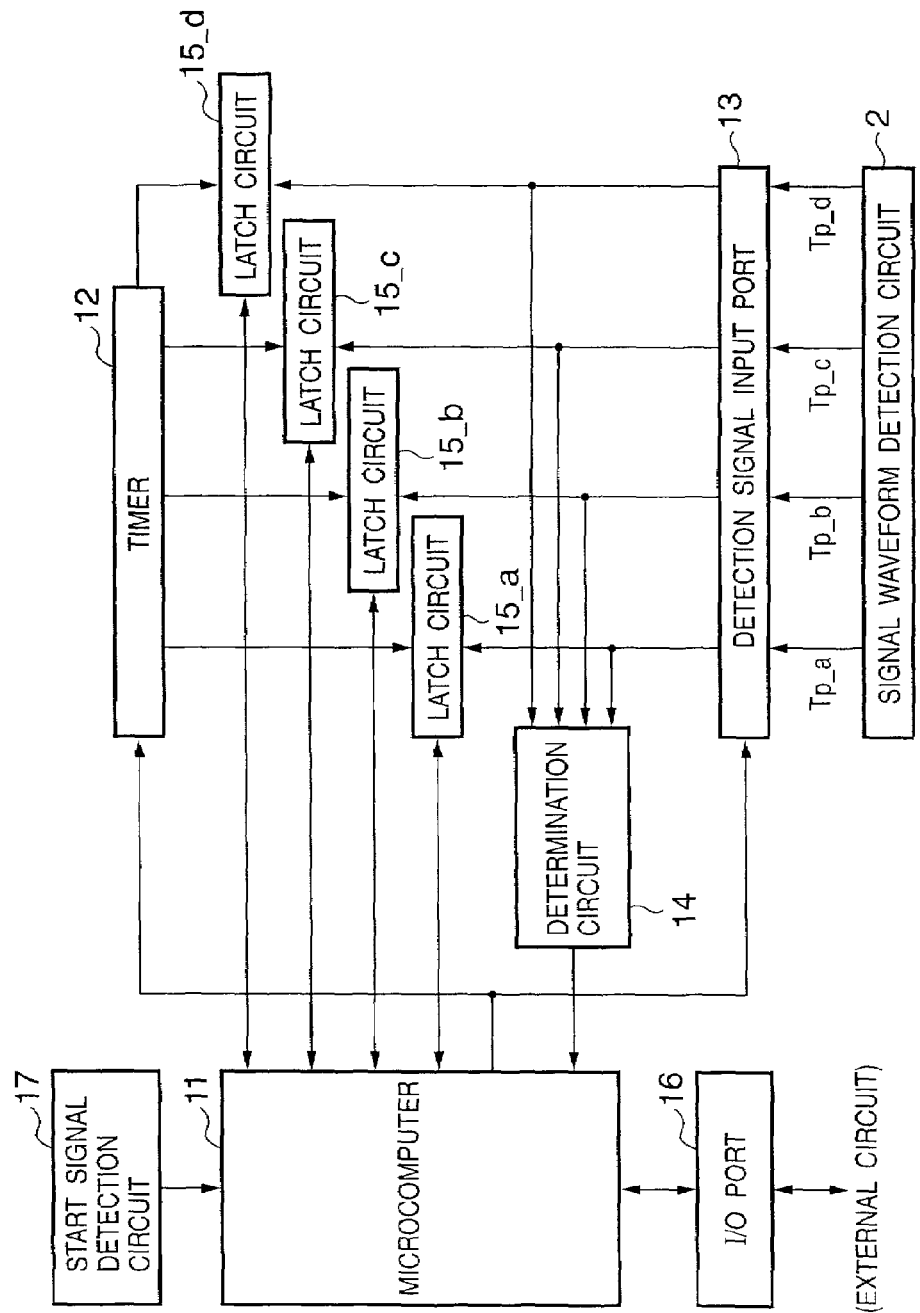
FIG. 5 is a block diagram showing the schematic arrangement of an arithmetic control circuit according to the present invention.

FIG. 5 is a block diagram showing the schematic arrangement of the arithmetic control circuit 1 according to the present invention.

Reference numeral 11 denotes a microcomputer for controlling the arithmetic control circuit 1 and the overall coordinate input apparatus. The microcomputer 11 is comprised of an internal counter, a ROM storing procedures, a RAM used for calculation and the like, a nonvolatile memory storing constants and the like, and the like. As described above, the driving circuit 44 emits a start signal, which is synchronous with the driving timing of the sound wave generator 43 in the coordinate input pen 4, as a light signal via an infrared LED or the like (not shown) incorporated in the coordinate input pen 4. This signal is detected by a start signal detection circuit 17 to start the timer 12 (e.g., formed by a counter or the like) in the arithmetic control circuit 1.

With this arrangement, the driving timing at which the sound wave generator 43 in the coordinate input pen 4 is driven can be synchronized with the timer 12 in the arithmetic control circuit 1, the time required for the sound wave generated by the sound wave generator 43 to arrive at each of the sensors 3_Sa to 3_Sd can be measured.

A vibration arrival timing signal (the signal 56 or a signal 59 to be described later) based on each of the sensors 3_Sa to 3_Sd and output from the signal waveform detection circuit 2 is input to a corresponding one of latch circuits 15_a to 15_d through a detection signal input port 13. Upon receiving the vibration arrival timing signals from the corresponding sensors 3_Sa to 3_Sd, the latch circuits 15_a to 15_d latch the count values of the timer 12 at the corresponding times.

Upon detecting that all the detection signals required for coordinate detection are received in this manner, a determination circuit 14 outputs a corresponding signal to the microcomputer 11. Upon receiving this signal from the determination circuit 14, the microcomputer 11 reads out the vibration arrival times corresponding to the respective sensors 3_Sa to 3_Sd from the latch circuits 15_a to 15_d and calculates the coordinate position of the coordinate input pen 4 by performing a predetermined calculation. The microcomputer 11 then outputs the calculation result to the display driving circuit 5 through an I/O port 16, thereby displaying, for example, a dot at a corresponding position on the display 6. In addition, by outputting the coordinate position information to an interface circuit (not shown) through the I/O port 16, a three-dimensional coordinate value can be output to an external device.

According to the above description, coordinates are calculated by using the envelope 54 and delay time Tg. However, coordinates can also be calculated by detecting a phase portion and performing time measurement. This method will be described in detail. As shown in FIG. 4, the output signal 53 from the sensors 3_Sa to 3_Sd is input to a Tp signal detection circuit 86 after unnecessary frequency components are removed from the signal by a bandpass filter 84. The Tp signal detection circuit 86 is comprised of a zero-crossing comparator, multivibrator, and the like. A signal associated with a zero-crossing point of the signal output from the bandpass filter 84 is compared with a gate signal 57 generated by a gate signal generating circuit 85 for comparing a signal with a predetermined threshold level, thereby generating a signal 58.

After this operation, the signal 56 for detecting the group delay time Tg described above is referred to as a gate signal (generated by the gate signal generating circuit 85), thereby generating the signal 59 that outputs the first zero-crossing point within the duration of this gate signal 56 at which the phase of the signal waveform output from the bandpass filter 84 crosses from the negative side to the positive side.

Likewise, a phase delay time Tp associated with a phase velocity Vp can be detected such that the timer 12 is operating in accordance with the start signal described above is stopped using this signal 59.

Strictly speaking, this phase delay time Tp includes a delay in the circuit associated with waveform processing. However, by a method to be described later, the influence of such a delay is completely eliminated. For the sake of simple explanation, therefore, it is assumed that there is no circuit delay time.

According to the above description, the distance L between the sound wave generator 43 and each of the sensors 3_Sa to 3_Sd can be obtained by the following equation:

$$L = Vp \times Tp \quad (2)$$

This signal 59, however, changes depending on the signal level of the signal 53, as described above. If, for example, the signal level decreases, the gate signal generation position changes due to a gate signal compared with a threshold. For example, a signal 58' (phase delay time Tp') shows this state. However, the difference between this phase delay time Tp' and the phase delay time Tp is an integer multiple of the phase period of the detection signal waveform 53, and the following relation is always satisfied:

$$Tp = Tp' + n \times T \quad (3)$$

where n is an integer, and T is the phase period of a detection signal waveform, which is a known value. A substitution of equation (3) into equation (2) and the use of equation (1) yield $$n = Int[(Vg \times Tg - Vp \times Tp')/\lambda p + 0.5] \quad (4)$$

where λp is the wavelength of a sound wave, which is equal to the product of the phase velocity Vp and a period T. Therefore, the integer n becomes a known value, and the distance L can be calculated with high precision by using equations (2) and (3).

In this manner, the group delay time Tg can be calculated, and coordinates can also be calculated from the group delay time Tg and the phase delay time Tp.

In the above embodiment, the detected time includes the electrical processing time by the circuit and the like in addition to the time required for the sound wave emitted from the sound wave generator 43 to arrive at each of the sensors 3_Sa to 3_Sd. Therefore, a method of removing the time measured other than the time taken for a sound wave to propagate will be described below.

The group delay time Tg latched by the latch circuit and the phase delay time Tp include a group circuit delay time etg and phase circuit delay time etp, respectively. These circuit delay times always include the same value for each time measurement. Letting t* be the time measured by a given measuring circuit when a sound wave propagates from the sound wave generator 43 to each of the sensors 3_Sa to 3_Sd, e be the circuit delay time in the measuring circuit, and t be the time actually taken for the sound wave to propagate from the sound wave generator 43 to each of the sensors 3_Sa to 3_Sd, $$t^* = t + e \quad (5)$$

Letting tini* be the time measurement value at a known distance Lini between the sound wave generator 43 and each sensor, e be the circuit delay time in the measuring circuit, and tini be the time actually taken for the sound wave to propagate, $$tini^* = tini + e \quad (6)$$

Therefore, $$t^* - tini^* = t - tini \quad (7)$$

Letting V be the sound velocity of the sound wave, $$V \times (t^* - tini^*) = V \times (t - tini) \quad (8)$$
$$= V \times t - Lini$$

Consequently, the arbitrary distance L (to be obtained) between the sound wave generator 43 and the sensor 3 is given by $$L = V \times t = V \times (t^* - tini^*) + Lini \quad (9)$$

If the known distance Lini and the time measurement value tini* at the distance (a group delay time Tgini* or phase delay time Tpini* or both) are stored in a storage medium such as a nonvolatile memory at the time of shipment, an arbitrary distance between the sound wave generator 43 and each of the sensors 3_Sa to 3_Sd can be accurately calculated.

Figure 6:
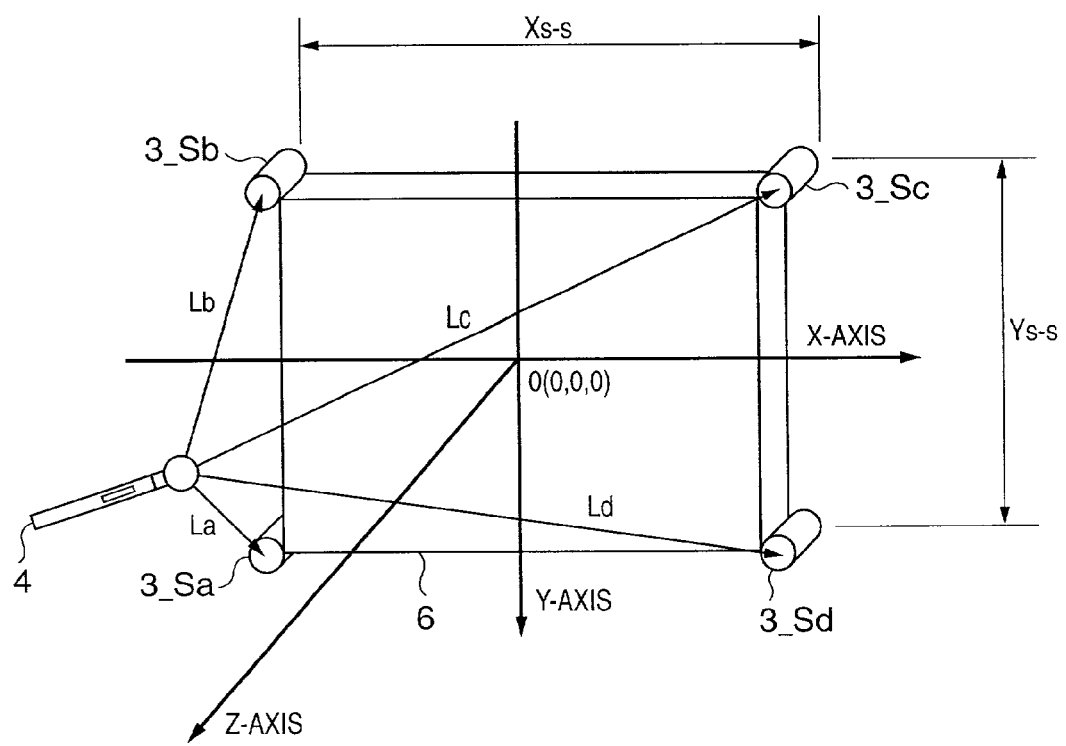
FIG. 6 is a view for explaining a coordinate system according to the present invention.

A method of obtaining position coordinates (X, Y, Z) of the sound wave generator 43 when the sensors 3_Sa to 3_Sd are arranged in a coordinate system like the one shown in FIG. 6 will be described next.

Letting La to Ld be the distances from the sound wave generator 43 to the respective sensors 3_Sa to 3_Sd, which are accurately obtained by the above method, Xs-s be the distance between the sensors in the X direction, and Ys-s be the distance between the sensors in the Y direction, $$Lb^2 - \left(\frac{Xs-s}{2} + X\right)^2 = Lc^2 - \left(\frac{Xs-s}{2} - x\right)^2 \quad (10)$$

$$x = \frac{Lb^2 - Lc^2}{2Xs-s} \quad (11)$$

Likewise, $$y = \frac{Lb^2 - La^2}{2Ys-s} \quad (12)$$

$$z = \sqrt{Lb^2 - \left(\frac{Xs-s}{2} + x\right)^2 - \left(\frac{Ys-s}{2} + y\right)^2} \quad (13)$$

As described above, if at least three of the distances from the sound wave generator 43 to the sensors 3_Sa to 3_Sd can be measured, the position (space) coordinates of the sound wave generator 43 can be easily obtained.

This makes it possible to realize coordinate input operation on the display window of the display 6 with excellent usability like the relationship between paper and pen. The operator can therefore write characters and lines on the display window and control external devices such as a personal computer connected to the coordinate input apparatus. In addition, by applying this technique, a coordinate input apparatus can be provided, which allows coordinate input operation from a place that is not near the display window.

A coordinate input operation which allows coordinate input operation from a place relatively far from the display window of the display 6 will be described below.

The coordinate input areas defined by the coordinate input apparatus will be described first.

Figure 7:
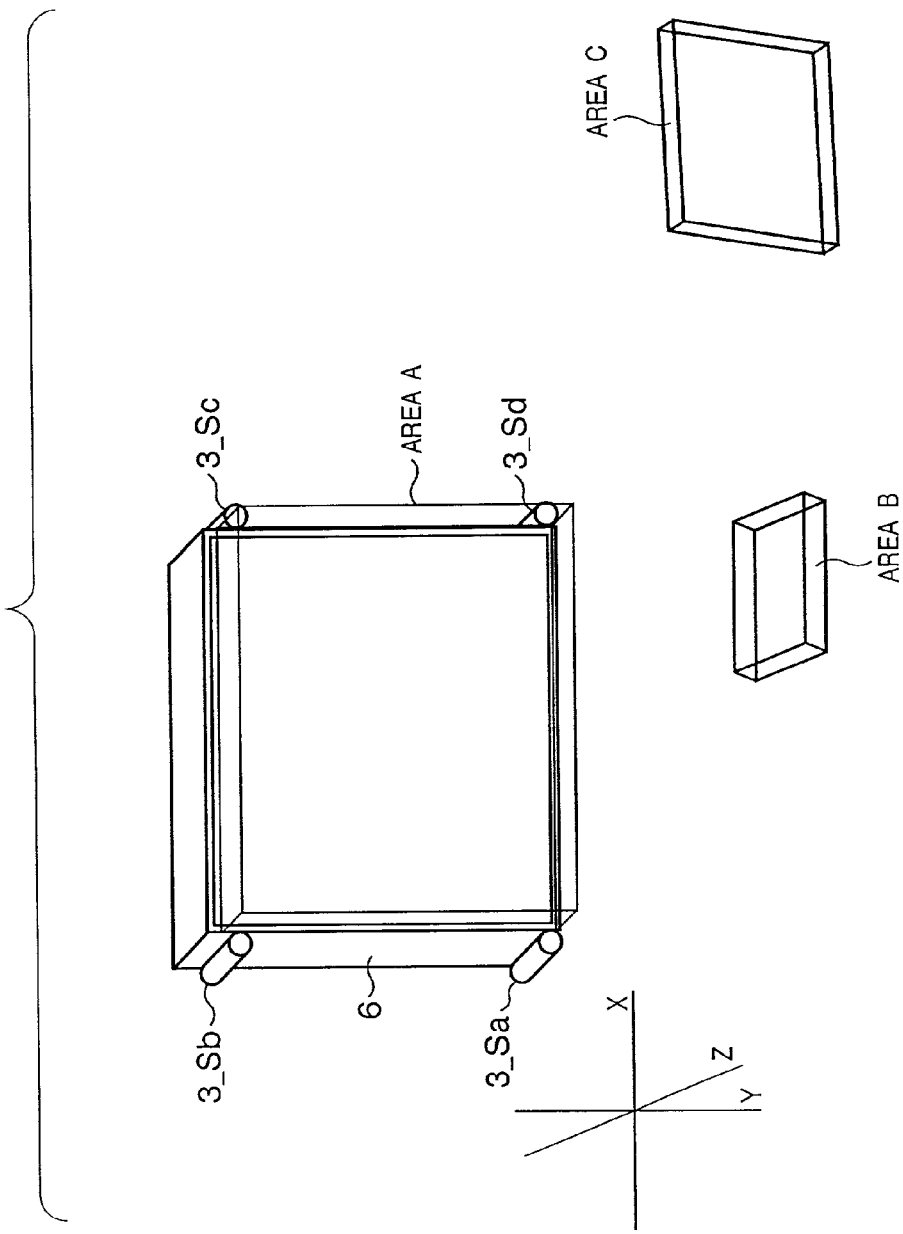
FIG. 7 is a schematic view showing coordinate input areas for the coordinate input apparatus according to the present invention.

FIG. 7 is a schematic view showing the coordinate input areas defined by the coordinate input apparatus of the present invention.

As shown in FIG. 7, spatial areas A, B, and C are independently defined as coordinate input areas corresponding to the display window of the display 6.

This allows a speaker in a conference to input coordinates near the area A, and also allows an inquirer to input coordinates on a conference desk placed near the area B or input coordinates in a space in the area C like a pointer.

Such a coordinate input area in a space can be determined as follows.

Figure 8:
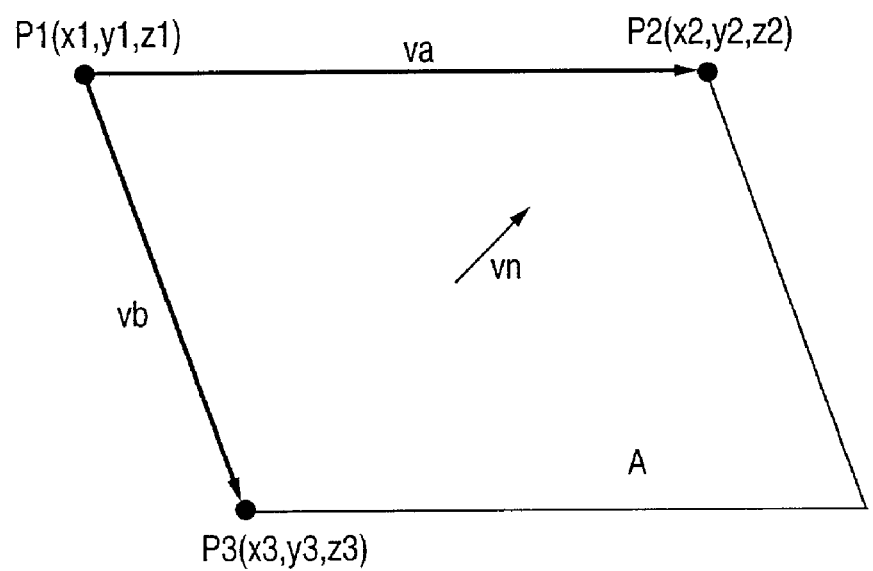
FIG. 8 is a view showing the definition of a coordinate input area according to the present invention.

A coordinate input area for defining the area A will be described here with reference to FIG. 8. However, the same applies to the areas B and C.

A mathematical expression for the area A is determined from three points P1 (x1, y1, z1), P2 (x2, y2, z2), and P3 (x3, y3, z3) in the area A.

In this case, a vector va that connects P1 and P2 and a vector vb that connects P1 and P3 are given by $$va(x2-x1, y2-y1, z2-z1) \quad (14)$$

$$vb(x3-x1, y3-y1, z3-z1) \quad (15)$$

A vector vn in a direction perpendicular to the two vectors va and vb can be obtained by obtaining the outer product of the vectors va and vb.

In general, a plane like the area A is expressed by $$ax+bx+cz+d=0 \quad (16)$$

In this case, constants a, b, and c are given as components of the vector vn, and hence can be determined by $$a=(y2-y1)(z3-z1)-(z2-z1)(y3-y1) \quad (17)$$

$$b=(z2-z1)(x3-x1)-(x2-x1)(z3-z1) \quad (18)$$

$$c=(x2-x1)(y3-y1)-(y2-y1)(x3-x1) \quad (19)$$

When these constants a, b, and c are determined, d can be determined by substituting one of the three-dimensional coordinate values of the points P1, P2, and P3 into equation (16). This makes it possible to define the area A.

It is checked whether an input three-dimensional coordinate value falls within the coordinate input area (area A) defined in advance. If it is determined that this three-dimensional coordinate value falls within the area A, the value is converted into a two-dimensional coordinate value on the display window of the display 6 by using the points P1, P2, and P3. This value is then output to allow operation on the window in an arbitrary place.

Determination of a coordinate input area to which the three-dimensional coordinate value obtained by coordinate input operation belongs and conversion to two-dimensional coordinates are performed in the following manner.

In actual determination, an obtained three-dimensional coordinate value may be substituted into the above mathematical expression to check whether the mathematical expression holds. In practice, however, it is difficult to input coordinates unless the area has a certain width. For this reason, a given threshold Th may be defined, and determination may be done by checking whether an obtained three-dimensional coordinate value falls within the corresponding range. That is, if the following inequality (area determination expression):

$$|ax'+by'+cz'+d| \leq Th \quad (20)$$

is satisfied with respect to an obtained three-dimensional coordinate value Pn (x', y', z'), then it is determined that the coordinate value falls within the coordinate input area as a determination target. This makes it possible to perform determination with respect to a coordinate input area having a certain width.

On the basis of the above determination result, the obtained three-dimensional coordinate value is converted into two-dimensional coordinates in the determined coordinate input area.

Letting D12 be the distance between the points P1 and P2, D13 be the distance between the points P1 and P3, and L1, L2, and L3 be the distances from a point Pn to the points P1, P2, and P3, two-dimensional coordinates in the coordinate input area in a space can be calculated as follows, with the midpoints between P1 and P2 and between P1 and P3 being set as origins:

$$x=(L1^2-L2^2)/2D12 \quad (21)$$

$$y=(L1^2-L3^2)/2D13 \quad (22)$$

These obtained two-dimensional coordinate values may be matched with the display window of the display 6 by using magnifications αx and αy and offsets βx and βy. The magnifications αx and αy can be calculated from the ratios between the display window coordinates and D12 and D13, and the offsets βx and βy can be calculated from the coordinate values from the origin positions on the display window to the center of the window and the above magnifications.

If the three arbitrary points P1, P2, and P3 on the coordinate input area defined in a space in the above manner are set and stored in a nonvolatile memory in the arithmetic control circuit 1, coordinates can be input in a coordinate input area in an arbitrary space. In addition, a plurality of such coordinate input areas, e.g., an area near the display window of the display 6, an area on a conference table, and an arbitrary space are defined, and the coordinate values of arbitrary points in the respective input areas are stored in advance. With respect to obtained three-dimensional coordinate values and the respective coordinate input areas, determination based on the above area determination expressions is performed, and the three-dimensional coordinate values are converted into two-dimensional coordinate values in the determined coordinate input areas, thereby allowing coordinate input operation in a plurality of places, as shown in FIG. 7.

The above series of coordinate calculating operations will be described next with reference to FIG. 9.

Figure 9:
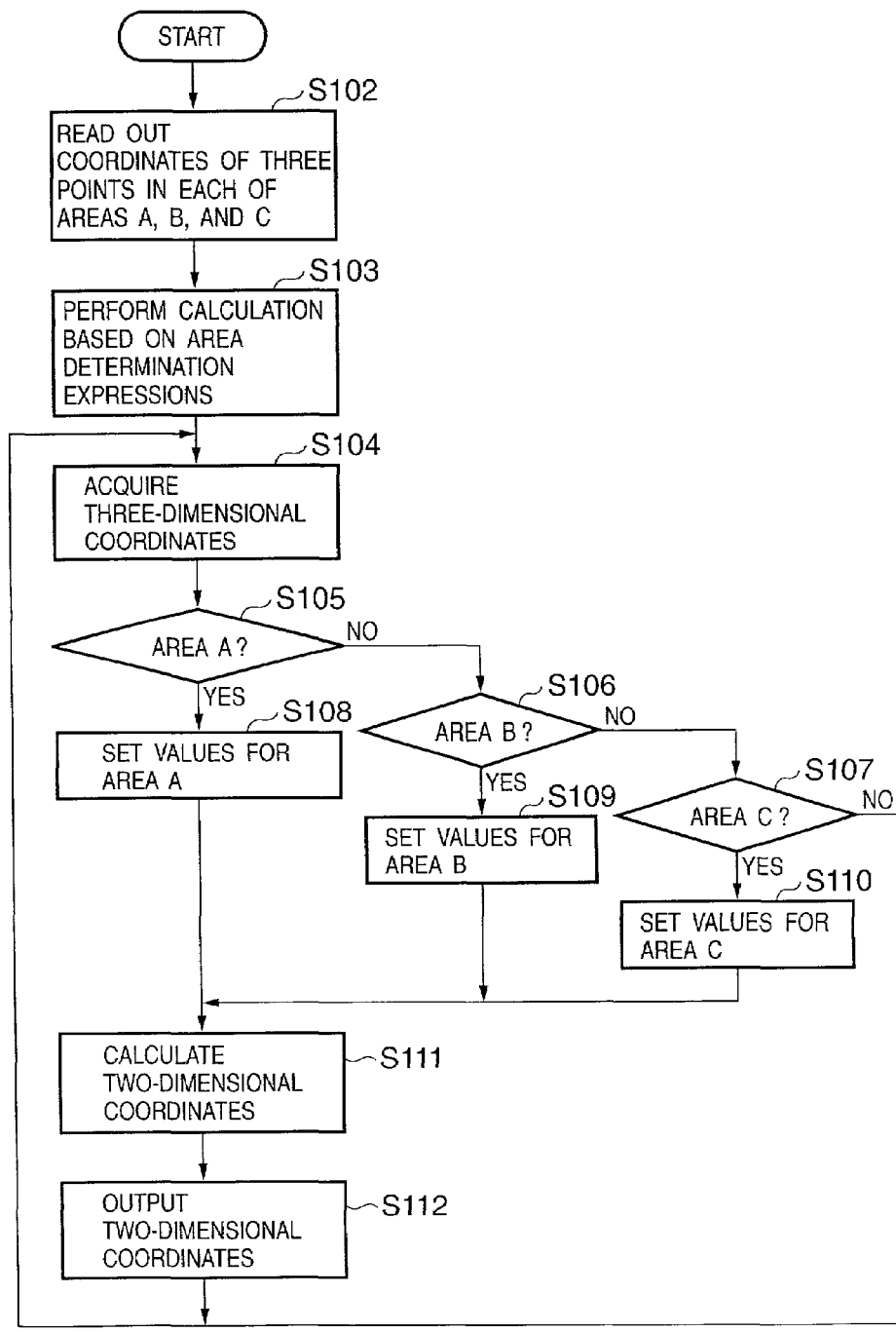
FIG. 9 is a flowchart showing coordinate calculation processing according to the present invention.

FIG. 9 is a flowchart showing coordinate calculation processing according to the present invention.

Coordinate calculation processing to be performed when the areas A, B, and C shown in FIG. 7 are respectively defined as coordinate input areas will be described with reference to FIG. 9.

First of all, this apparatus is powered on, and the three-dimensional coordinate values of three points in each of the areas A, B, and C are read out from the nonvolatile memory in step S102. In step S103, calculation based on the above area determination expressions is performed with respect to each three-dimensional coordinate value in each area, and the threshold Th for each area which is obtained by the calculation is stored in the nonvolatile memory.

Subsequently, the flow advances to the operation of acquiring an actual three-dimensional coordinate value corresponding to the coordinate input operation performed by the operator.

In step S104, the three-dimensional coordinate value corresponding to the coordinate input operation performed by the operator is acquired. In step S105, it is checked whether the acquired three-dimensional coordinate value belongs to the area A. If the value belongs to the area A (YES in step S103), the flow advances to step S108 to set necessary values for two-dimensional coordinate conversion in the area A.

If the value does not belong to the area A (NO in step S105), the flow advances to step S106 to check whether the acquired three-dimensional coordinate value belongs to the area B. If the value belongs to the area A (YES in step S106), the flow advances to step S109 to set necessary values for two-dimensional coordinate conversion in the area B.

If the value does not belong to the area B (NO in step S105), the flow advances to step S107 to check whether the acquired three-dimensional coordinate value belongs to the area C. If the value belongs to the area C (YES in step S107), the flow advances to step S110 to set necessary values for two-dimensional coordinate conversion in the area C. If the value does not belong to the area C (NO in step S107), the flow returns to step S104.

In step S111, a two-dimensional coordinate value in the determined area is calculated, in the area where the acquired three-dimensional coordinate value is determined, on the basis of the values set in one of steps S108 and S109. In step S112, the calculated two-dimensional coordinate value is output to an external device such as a personal computer. Subsequently, the same processing is repeated.

Note that only the area A in which coordinates are directly input on the display window of the display 6 may be set as a coordinate input area at the time of shipment, while the user may be allowed to set the remaining areas B and C. For example, a coordinate input area setting window may be displayed on the display window by using driver software or the like installed in an external device such as a personal computer to prompt the user to set a coordinate input area at an arbitrary position. Alternatively, a coordinate input area setting switch or the like is provided for the indicating tool 4. When the user presses the switch, the current mode shifts to the coordinate input area setting mode. The user then indicates three points in an arbitrary space in the place where he/she is present. The three-dimensional coordinate values of the three points are stored in a nonvolatile memory or the like. This makes it possible to set the space as a coordinate input area.

As described above, according to the above embodiment, in order to define an arbitrary space as a coordinate input area, the three-dimensional coordinate values of at least three arbitrary points in the coordinate input area are stored in advance. Whether a three-dimensional coordinate value acquired by coordinate input operation falls within the defined coordinate input area can be determined on the basis of the stored three-dimensional coordinate values of the three points in the coordinate input area. This makes it possible to define, as a coordinate input area, an arbitrary space near the user who is present in an arbitrary place relatively far from the display 6 as well as allowing the user to input coordinates near the display window of the display 6, thereby providing a coordinate input apparatus with excellent usability.

OTHER EMBODIMENT

In the above coordinate input operation, pen-down operation and the like can be realized by making a pen tip switch 41 of an indicating tool 4 or a plurality of pen side switches 42 correspond to the left or right switch of a mouse. When a coordinate input area is set in a space, pen-down operation and the like can be realized by overlaying a plurality of coordinate input areas.

Figure 10:
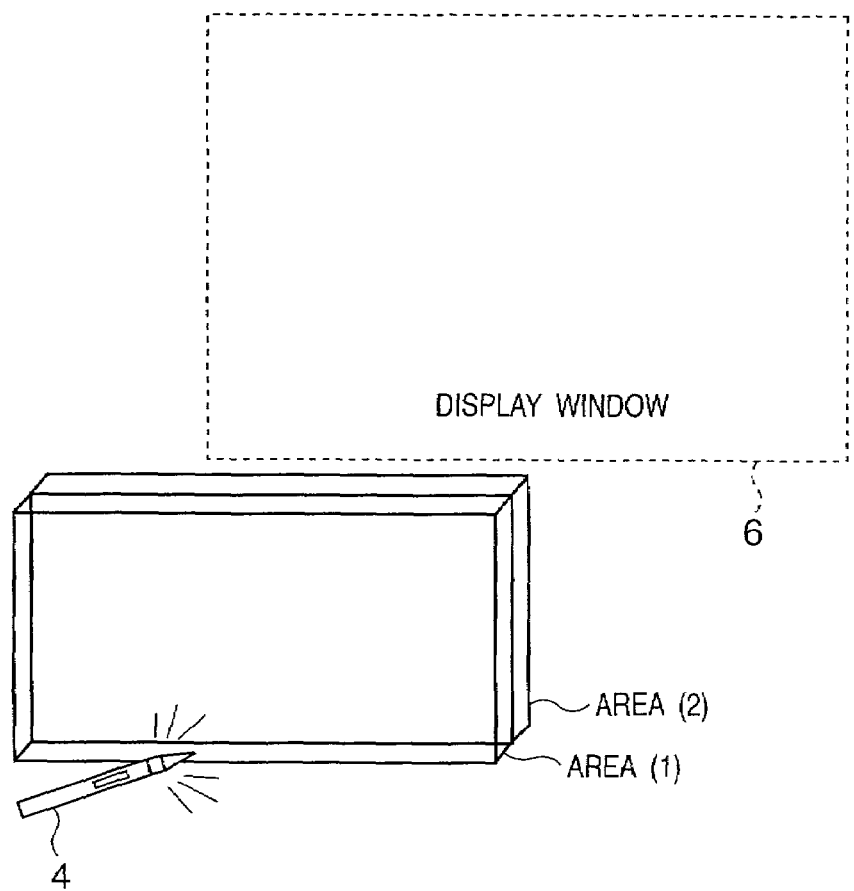
FIG. 10 is a view showing an example of how a plurality of coordinate input areas are overlaid according to the present invention.

FIG. 10 is a view showing an example of how a plurality of coordinate input areas are overlaid according to the present invention.

On the display window of a display 6, areas (1) and (2) defined in the air are set in a stacked state as coordinate input areas.

If, for example, it is determined that the indicating tool 4 exists in the area (1), pen-up operation is determined, and two-dimensional coordinates are output. If it is determined that the indicating tool 4 exist in the area (2), pen-down operation (corresponding to pressing on the left switch of the mouse) is determined, and two-dimensional coordinates can be output.

This determination processing will be described with reference to FIG. 11.

Figure 11:
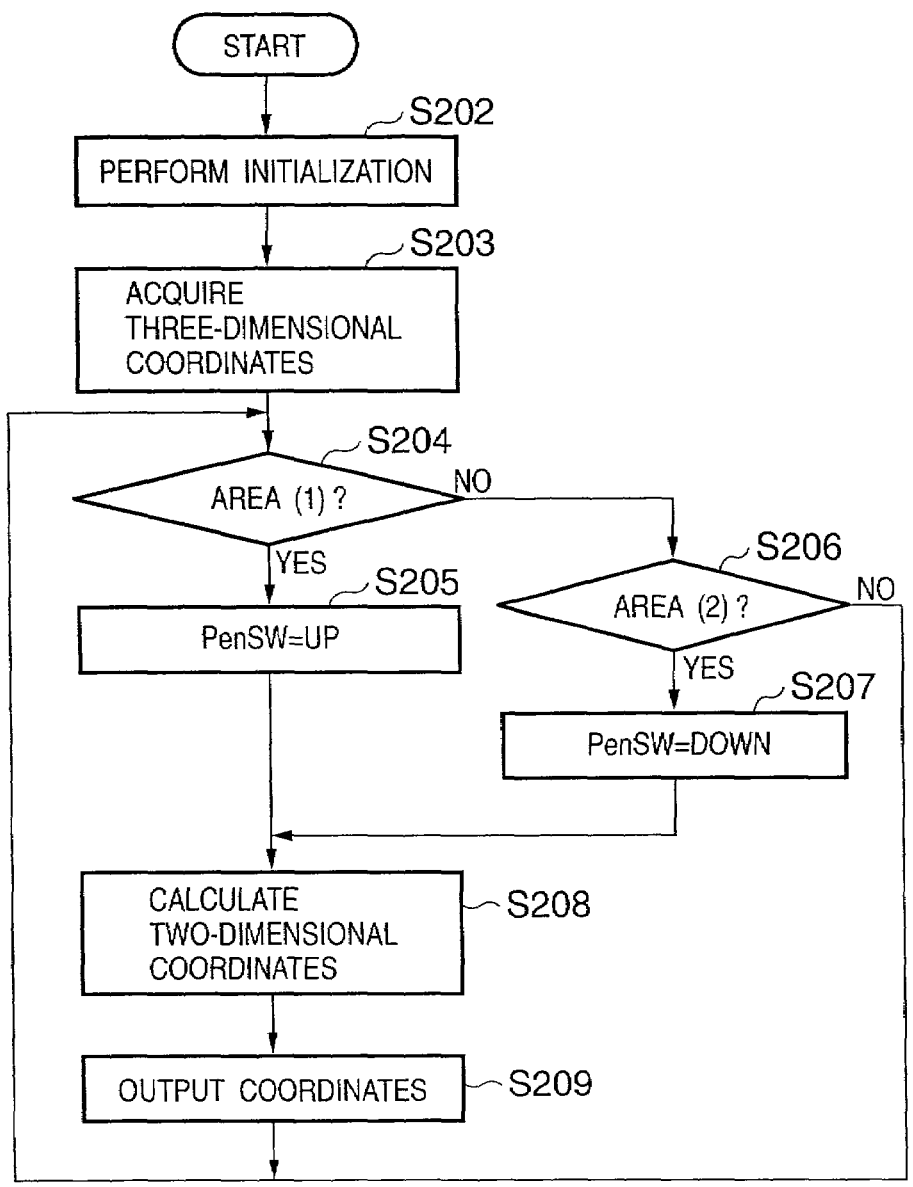
FIG. 11 is a flow chart showing determination processing according to the present invention.

FIG. 11 is a flow chart showing determination processing in the present invention.

In step S202, initialization is performed. This operation corresponds to the processing in steps S102 and S103. Thereafter, in step S203, a three-dimensional coordinate value corresponding to the coordinate input operation performed by the operator is acquired. In step S204, it is checked whether the acquired three-dimensional coordinate value belongs to the area (1). If the value belongs to the area (1) (YES in step S204), the flow advances to step S205 to define pen-up operation as switch information (PenSW=UP).

If the value does not belong to the area (1) (NO in step S204), the flow advances to step S206 to check whether the acquired three-dimensional coordinate value belongs to the area (2). If the value belongs to the area (2) (YES in step S206), the flow advances to step S207 to define pen-down operation as switch information (PenSW=DOWN). If the value does not belong to the area (2) (NO in step S206), the flow returns to step S203. If the value does not belong to the area (2) (NO in step S206), the flow returns to step S203.

In step S208, two-dimensional coordinates are calculated in the area where the acquired three-dimensional coordinate value is determined. In step S209, the switch information defined in either step S205 or step S207 and the calculated two-dimensional coordinate value are output to an external device such as a personal computer, and the same processing is repeated subsequently.

Figure 12:
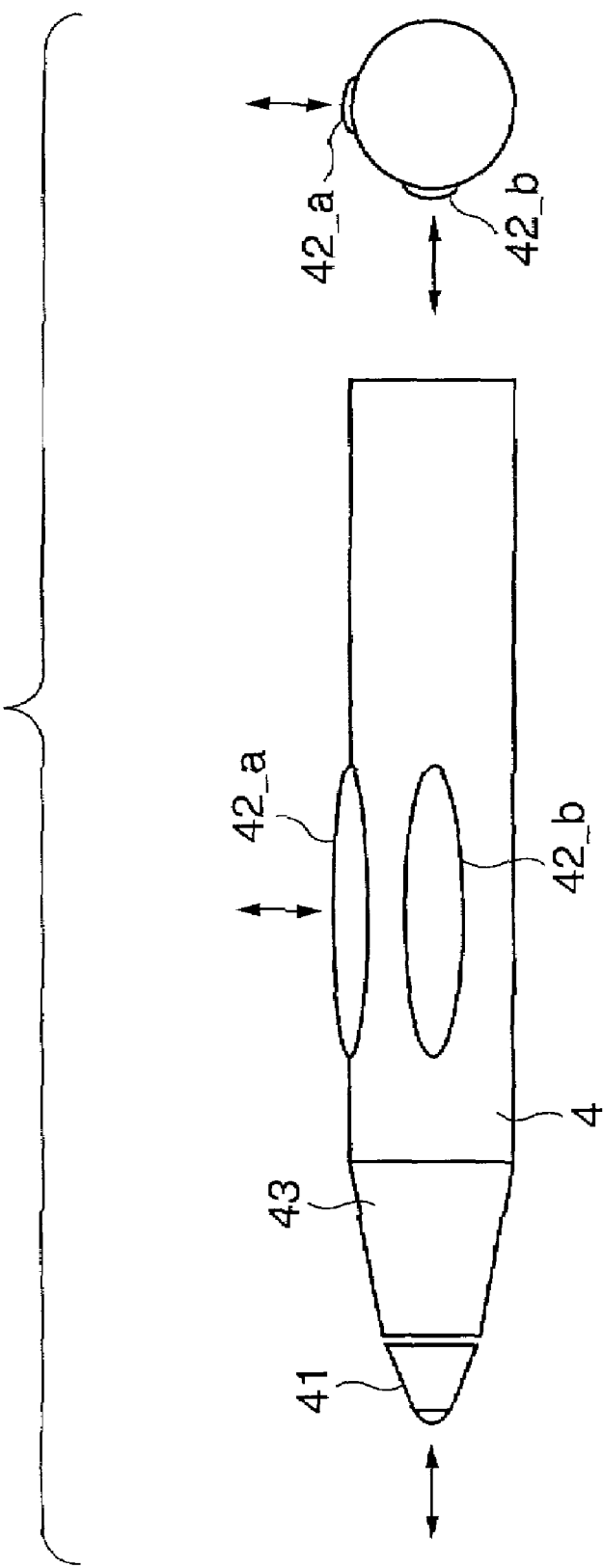
FIG. 12 is a view showing an outer appearance of a coordinate input pen according to the present invention.

The operation of executing predetermined processing corresponding to mouse operation may be defined with respect to a switch of the indicating tool for each coordinate input area as well as determination of switch information in each coordinate input area. Assume that pen side switches 42_a and 42_b shown in FIG. 12 are set in correspondence with the left and right buttons of a mouse at the time of shipment. Even in this case, the switches may be interchanged depending on whether the user is right-handed or left-handed. More specifically, as shown in FIG. 13, a definition table is formed, which defines predetermined operations for the respective switches of the indicating tool, and coordinate input operation is controlled in accordance with this definition table.

The definition table shown in FIG. 13 will be described below. In the area A, the function of the left button (Left) is assigned to a pen tip switch 41, the function of the left button (Left) of the mouse is assigned to the pen side switch 42_a, and the function of the right button (Right) of the mouse is assigned to the pen side switch 42_b. Pen-down operation (Pen Down signal) is determined in accordance with the pen tip switch 41.

In the area B, the function of double click (Double click) is assigned to the pen tip switch 41, the function of the right button (Right) of the mouse is assigned to the pen side switch 42_a, and the function of the left button (Left) of the mouse is assigned to the pen side switch 42_b. Pen-down operation is determined in accordance with the pen side switch 42_b.

In the area C, the function of the left button (Left) is assigned to the pen tip switch 41, the function of the left button (Left) is assigned to the pen side switch 42_a, and the function of right button (Right) of the mouse is assigned to the pen side switch 42_b. In this area, operation is defined to always output pen-down (Down).

By setting switch information for each coordinate input area or switching switch pressing operations in this manner, the above pen-down operations or the left and right buttons of the mouse are interchanged depending on whether the user is right-handed or left-handed, thereby realizing an interface with higher usability.

In the above embodiment, the indicating tool 4 has been described mainly in association with the coordinate input apparatus using ultrasonic waves in the air. However, the present invention is not limited to this. For example, the present invention can be applied to any coordinate input apparatus capable of detecting three-dimensional coordinate values regardless of the method for detection, e.g., apparatuses using infrared light and radio waves.

Since there is no need to ensure a space for a coordinate input area such as a tablet, the present invention is effective not only for a large display used in a conference or the like but also on a desk.

As has been described above, according to the above embodiment, since switch information and button operation of a mouse can be set for each coordinate input area, input environments can be provided in accordance with a plurality of users even with a single coordinate input apparatus.

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R/RW, a DVD-ROM/RAM, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, program codes corresponding to the flow charts described above are stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus which detects three-dimensional position coordinates of an indicating tool used in combination with a display for displaying a window based on two-dimensional coordinates, comprising:
    storage means for storing a plurality of a set of coordinate values of a plurality of points for defining each of a plurality kinds of a three-dimensional space area which is positioned at a relative coordinate position against a position of the display;
    coordinate detection means for detecting a three-dimensional absolute coordinate value of the indicating tool in a three-dimensional space area;
    determination means for determining which three-dimensional space area defined by each of the plurality of the set of coordinate values stored in said storage means the detected three-dimensional absolute coordinate value belongs to; and
    conversion means for converting, responsive to a determination of said determination means that said three-dimensional absolute coordinate value belongs to said three-dimensional space area, a position of said three-dimensional absolute coordinate value in the three-dimensional space area into a display coordinate value of said display.

2. The apparatus according to claim 1, wherein said storage means stores a set of coordinate values of a plurality of points for defining each coordinate area for each of a plurality of types of coordinate input areas.

3. The apparatus according to claim 1, wherein said storage means further stores switch information indicating coordinate input operation of the indicating tool for each of the coordinate input areas.

4. The apparatus according to claim 1, wherein said storage means further stores a definition table for defining operation of executing predetermined processing corresponding to operation of a mouse with respect to a plurality of switches of the coordinate input area and the indicating tool.

5. A control method for a coordinate input apparatus which detects three-dimensional position coordinates of an indicating tool used in combination with a display for displaying a window based on two-dimensional coordinates, comprising:
    a storage step of storing, in a storage medium, a plurality of a set of coordinate values of a plurality of points for defining each of a plurality kinds of a three-dimensional space area which is positioned at a relative coordinate position against a position of the display;
    a coordinate detection step of detecting a three-dimensional absolute coordinate value of the indicating tool in a three-dimensional space area;
    a determination step of determining which three-dimensional space area defined by each of the plurality of the set of coordinate values stored in the storage medium the detected three-dimensional absolute coordinate value belongs to; and
    a conversion step of converting, responsive to a determination of said determination step that said three-dimensional absolute value belongs to said three-dimensional space area, a position of said three-dimensional absolute coordinate value in the determined three-dimensional space area into a display coordinate value of said display.

6. The method according to claim 5, wherein, in the storage step, a set of coordinate values of a plurality of points for defining each coordinate area for each of a plurality of types of coordinate input areas is stored in the storage medium.

7. The method according to claim 5, wherein, in the storage step, switch information indicating coordinate input operation of the indicating tool for each of the coordinate input areas is further stored in the storage medium.

8. The method according to claim 5, wherein, in the storage step, a definition table for defining operation of executing predetermined processing corresponding to operation of a mouse is further stored in the storage medium with respect to a plurality of switches of the coordinate input area and the indicating tool.

9. A computer-readable memory storing a program code for controlling a coordinate input apparatus which detects three-dimensional position coordinates of an indicating tool used in combination with a display for displaying a window based on two-dimensional coordinates, wherein the program code includes:
    a program code for a storage step of storing, in a storage medium, a plurality of a set of coordinate values of a plurality of points for defining each of a plurality kinds of a three-dimensional space area which is positioned at a relative coordinate position against a position of the display;
    a program code for a coordinate detection step of detecting a three-dimensional absolute coordinate value of the indicating tool in a three-dimensional space area;
    a program code for a determination step of determining which three-dimensional space area defined by each of the plurality the set of coordinate values stored in the storage medium the detected three-dimensional absolute coordinate value belongs to; and
    a program code for a conversion step of converting, responsive to a determination of said determination step that said three-dimensional absolute value belongs to said three-dimensional space area, a position of said three-dimensional absolute coordinate value in the determined three-dimensional space area into a display coordinate value of said display.

10. The apparatus according to claim 1, wherein said converting means calculates two-dimensional coordinate values in one of planes comprising the three-dimensional space area, and converts the two-dimensional coordinate values into the display coordinate value on the basis of a predetermined magnification and offset.

11. The method according to claim 5, wherein said converting step calculates two-dimensional coordinate values in one of planes comprising the three-dimensional space area, and converts the two-dimensional coordinate values into the display coordinate value on the basis of a predetermined magnification and offset.

* * * * *